Figure 1:
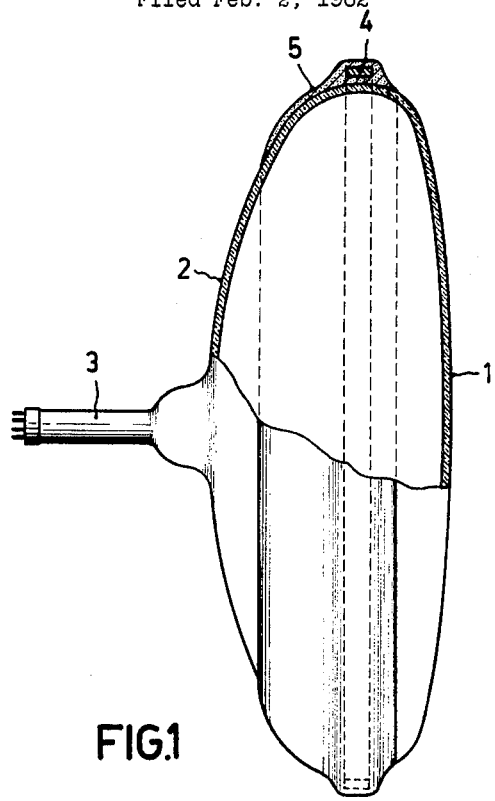

July 12, 1966   J. DE GIER ET AL   3,260,397
CATHODE RAY TUBE AND METHOD OF MAKING SAME
Filed Feb. 2, 1962

INVENTOR
JOHANNES DE GIER
WILLEM F. NIENHUIS
JAN W. RUIS
BY
AGENT

United States Patent Office 3,260,397
Patented July 12, 1966

3,260,397
CATHODE RAY TUBE AND METHOD
OF MAKING SAME
Johannes de Gier, Willem Fokko Nienhuis, and Jan Willem Ruis, all of Emmasingel, Eindhoven, Netherlands, assignors to North American Philips Company, Inc., New York, N.Y., a corporation of Delaware
Filed Feb. 2, 1962, Ser. No. 170,639
Claims priority, application Netherlands, Feb. 24, 1961, 261,678
10 Claims. (Cl. 220—2.1)

This invention relates to glass vessels and more particularly cathode-ray tubes having a glass wall, in which the transition zone between the window and the cone is surrounded by a metallic strengthening band.

Many structures are already known in which the transition zone between the window and the cone of a cathode-ray tube is provided with a metallic ring or band in order to strengthen the wall of the tube. The metallic band was clamped around the said zone by means of bolts or by contraction. It is also known to seal a metallic ring wholly or in part into the glass of the wall.

However, clamping bands have the disadvantage that it is almost impossible for the surfaces of the glass and the metal band to be treated so that the metal accurately engages the glass throughout. This results in an irregular distribution of the tensions; and the risk of breaking of the bulb is considerably increased. More particularly, if a pre-manufactured annular band is contracted round the wall, small divergences in the diameter of the annular band or of the bulb may already give rise to considerable differences in compression. Resilient bands have the disadvantage that the metal may yield, so that the strengthening effect is very small, apart from the fact that the resilient portions of the annular band result in an irregular contact surface between the band and the glass.

Known structures in which metallic rings are sealed wholly or in part into the glass of the tube wall also have a limitation in that expensive metal alloys have to be used and that the method is complicated.

These disadvantages may be completely avoided by means of a method according to the invention in which at least one pre-manufactured, metallic annular band the inner dimensions of which are larger than the outer dimensions of the wall part to be strengthened, is positioned around the wall part without the metal of the ring being in contact with the glass of the wall, whereupon at least the space between the annular band and the wall is filled up with a hardening synthetic material. Preferably a synthetic material is used which satisfactorily adheres to the metal and the wall. If desired, a thin layer of said synthetic material or of other synthetic material very satisfactorily adhering to the glass, may be preliminarily provided on the glass wall. Such an intermediate layer affords the advantage that the ring may readily be slipped around the glass wall since direct contact between metal and glass is thus prevented.

The space between the ring and the glass or the intermediate layer is filled by spraying with the hardenable synthetic material, it being possible for the metal ring, if desired, to be fully embedded in the synthetic material.

The ring may be made of a comparatively arbitrary metal. Preferably a steel ring is used.

Since the whole operation may be carried out without heating after the cathode-ray tube has been completely finished, the coefficient of expansion of the metal is of minor importance and additional pressure is not exerted upon the tube wall. However, if desired, the annular band may also be caused to exert a certain pressure upon the glass via the layer of synthetic material by carrying out the spraying process at an elevated temperature of the ring. The annular band then preferably consists of a metal having a high coefficient of expansion, such as aluminum.

It has been found that the glass now cannot disintegrate in case of breakage, i.e., a crack does not continue and the tube slowly fills with air thereby eliminating the risk of implosion. This is true even for a crack which occurs in the viewing window although the window itself it not covered with synthetic material. Such material may be provided over a zone located on each side of the metal ring and may be strengthened, if desired, with a glass texture or other texture of sufficiently strong material at the areas located outside the ring, so that even a fragment that might be beaten out of the wall is prevented from being flung away.

The synthetic material is preferably a non-saturated polyester resin. The intermediate layer may consist of polyvinyl acetate.

Figures 2, 3:
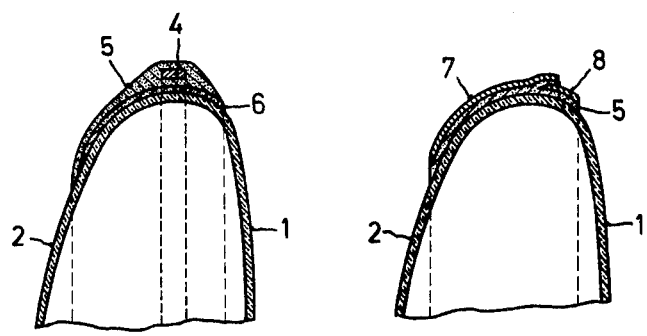

The invention will now be described, with reference to the accompanying drawing, in which:

FIGURE 1 is a sectional view of a cathode-ray tube according to the invention, and FIGURES 2 and 3 each show a detail of other embodiments.

FIGURE 1 shows the window 1, the glass cone 2 and the neck 3 of a television display tube. The transition zone between the window 1 and the cone 2 is surrounded by a metallic annular band 4 so that the metal does not contact the glass. The space between the glass and the annular band is filled by spraying with a synthetic material 5 which preferably surrounds the annular band completely and which extends over part of the tube wall on each side of the annular band 4.

The internal dimensions of the annular band 4, which is preferably of hard metal, such as steel, are a little larger than the external dimensions of the glass wall of the tube so that a gap of from 0.5 to 2 mm. remains between the wall and the annular band. The band 4 may be from 1 to 5 cm. wide and from 1 to 2 mm. thick, dependent upon the elasticity modulus and the tensile strength of the material. In fact, in case of breakage of the glass, the annular band must provide a strengthening of the layer of synthetic material such that the glass cannot disintegrate and the breakage does not continue in the glass. If desired, the layer of synthetic material may be further strengthened with fibrous material, such as glass fibers or glass texture, in the zones located outside the annular band.

To facilitate the positioning of the annular band 4 round the bulb, the annular band or the bulb, or both of them, may be preliminarily covered with an intermediate layer preferably consisting of a satisfactorily adhering synthetic material, such as polyvinyl acetate, so that the annular band may readily be slipped round the bulb since the intermediate layer prevents direct contact between metal and glass. Such an intermediate layer, which may alternatively consist of fibrous material, such as glass fibers or glass texture, is indicated by 6 in FIGURE 2. Since the annular band requires no heating, it does not exert pressure upon the bulb but only prevents the glass from disintegrating in case of breakage. If, however, a certain pressure is desired, the ring may be heated during the application of the synthetic material and, after hardening thereof, is allowed to cool down.

A suitable layer 5 of synthetic material may be obtained by using the polycondensation product of an alpha-beta unsaturated dicarboxylic acid and a multivalent alcohol. The polyester may still be modified with a dicarboxylic acid which is saturated and/or contain a halogen. Glycols or glycerol may be used as multivalent alcohols. Solutions from 50% to 70% by weight of unsaturated polyester in styrene are very suitable.

The hardening process may take place by the action of combinations of catalysts known per se for this purpose, such as benzoyl peroxide, methyl-ethylketone peroxide and the like, and accelerators such, for example, as cobalt naphthenate or dimethylaniline.

In order to prevent the polyester from hardening prematurely, it is possible, shortly prior to applying the synthetic material, to mix a solution of the catalyst in a proportion of the polyester-styrene mixture with a solution of the hardening accelerator in the balance of the polyester-styrene mixture.

The unsaturated solution of polyester may, in addition to coloring matter and pigments, also contain fillers such, for example, as titanium dioxide ($TiO_2$) for the purpose of avoiding contraction and cracking of the layer during the hardening process.

The glass wall may itself be strengthened further by providing a glaze layer under compressive stress, as previously suggested by the applicant, in which event the wall of the glass may be chosen of a considerably smaller thickness.

If a conductive outer layer is to be present on the glass wall, such a layer may be provided over the layer of synethetic material. However, it is alternatively possible for the synthetic material of the layer 5, or of the intermediate layer 6 itself, to be made conductive by adding particles of metal or graphite.

In the embodiment shown in FIGURE 3, two annular bands 7 and 8 are provided the shapes of which have been adapted to the profile of the glass wall 2. In this case also the space between the annular bands 7 and 8 and the glass 2 is filled with a layer 5 of synthetic material.

What is claimed is:

1. A method of strengthening a part of a wall of an evacuated glass vessel comprising the steps positioning about the part of the wall to be strengthened without subjecting the wall to compressive stress a metal band having a rigid configuration corresponding to the outer surface of the wall part to be strengthened, said metal band having internal dimensions which are larger than the dimensions of the part of the wall to be strengthened whereby the band surrounds and is spaced from the wall part to be strengthened without being in contact with any portion thereof and does not subject the wall to compressive stress, and filling the space between the metal band and the part of the wall to be strengthened with a hardenable synthetic material which adheres to the metal and the wall.

2. A method of strengthening a part of a wall of an evacuated glass vessel comprising the steps positioning about the part of the wall to be strengthened a metal band having a rigid configuration corresponding to the outer surface of the wall part to be strengthened, said metal band having internal dimensions which are larger than the dimensions of the part of the wall to be strengthened whereby the band surrounds and is spaced from the wall part to be strengthened without being in contact with any portion thereof and does not subject the wall to compressive stress, and embedding the metal band in a hardenable synthetic resin which fills the space between the metal band and the part of the wall to be strengthened.

3. A method of strengthening a part of a wall of an evacuated glass vessel comprising the steps, applying a relatively thin layer of a hardenable synthetic resin about the part of the wall to be strengthend, positioning about the part of the wall to be strengthend a rigid metal band having a configuration corresponding to the outer surface of the wall part to be strengthened without subjecting the wall to compressive stress, said metal band having internal dimensions which are larger than the dimensions of the part of the wall to be strengthened whereby the band surrounds and is spaced from the wall part to be strengthened without being in contact with any portion thereof and does not subject the wall to compressive stress, and filling the space between the metal band and the part of the wall to be strengthened with the hardenable synthetic material which adheres to the metal and the wall.

4. A method of strengthening a part of a wall of an evacuated glass vessel comprising the steps positioning about the part of the wall to be strengthened without subjecting the wall to compressive stress a metal band having a rigid configuration corresponding to the outer surface of the wall part to be strengthened, said metal band having internal dimensions which are larger than the dimensions of the part of the wall to be strengthened whereby the band surrounds and is spaced from the wall part to be strengthened without being in contact with any portion thereof and does not subject the wall to compressive stress, and filling the space between the metal band and the part of the wall to be strengthened with an unsaturated polyester resin which adheres to the metal and the wall.

5. A method of strengthening a part of a wall of an evacuated glass vessel comprising the steps positioning about the part of the wall to be strengthened without subjecting the wall to compressive stress a metal band having a rigid configuration corresponding to the outer surface of the wall part to be strengthened, said metal band having internal dimensions which are larger than the dimensions of the part of the wall to be strengthened whereby the band surrounds and is spaced from the wall part to be strengthened without being in contact with any portion thereof and does not subject the wall to compressive stress, and filling the space between the metal band and the part of the wall to be strengthened with a conductive hardenable synthetic material which adheres to the metal and the wall and contains electrically conductive particles.

6. A method of strengthening a part of a wall of an evacuated glass vessel comprising the steps, applying a relatively thin layer of a hardenable synthetic resin about the part of the wall to be strengthened, positioning about the part of the wall to be strengthened without subjecting the wall to compressive stress a rigid metal band having a configuration corresponding to the outer surface of the wall part to be strengthened, said metal band having internal dimensions which are larger than the dimensions of the part of the wall to be strengthened whereby the band surrounds and is spaced from the wall part to be strengthened without being in contact with any portion thereof and does not subject the wall to compressive stress, and embedding the metal band in the hardenable synthetic resin which fills the space between the metal band and the part of the wall to be strengthened, at least one of the layer and the portion of the resin in which the band is embedded containing conductive particles.

7. A cathode ray tube comprising an evacuated glass envelope having a face portion and an adjoining cone portion, an annular metal band spacedly positioned around the periphery of said tube in the transition zone between the face portion and the cone portion, said metal band being rigid, and conforming to the shape of that portion of the tube which it surrounds, without subjecting the envelope to compressive stress, and a hardened synthetic resin which adheres to metal and glass filling the space between the metal band and the envelope.

8. A cathode ray tube comprising an evacuated glass envelope having a face portion and an adjoining cone portion, an annular metal band spacedly positioned around the periphery of said tube in the transition zone between the face portion and the cone portion, said metal band being rigid, and conforming to the shape of that portion of the tube which it surrounds without subjecting the envelope to compressive stress, and a hardened synthetic resin which adheres to metal and glass surrounding and filling the space between the metal band and the envelope.

9. A cathode ray tube comprising an evacuated glass envelope having a face portion and an adjoining cone portion, an annular metal band spacedly positioned around the periphery of said tube in the transition zone between the face portion and the cone portion, said metal band being rigid, and conforming to the shape of that portion of the tube which it surrounds without subjecting the envelope to compressive stress, and a hardened synthetic resin which adheres to metal and glass and contains conductive particles filling the space between the metal band and the envelope.

10. A cathode ray tube comprising an evacuated envelope having a face portion and a cone portion, a layer of hardened synthetic resin which adheres to glass covering the transition zone between the face portion and the cone portion, a rigid annular metal band having an internal diameter greater than the maximum external diameter of the envelope with said resin layer thereon surrounding and spaced from said resin layer and conforming to the shape of that portion of the tube covered by the resin layer without subjecting the envelope to compressive stress, and a second layer of the hardened synthetic resin which adheres to metal filling the space between the metal band and the first layer.

References Cited by the Examiner
UNITED STATES PATENTS

| | | | |
|---|---|---|---|
| 1,639,575 | 8/1927 | Robinson | 156—293 |
| 2,293,529 | 8/1942 | Bedford | 314—49 X |
| 2,874,017 | 2/1959 | Henry et al. | 316—19 |
| 2,889,952 | 6/1959 | Claypoole | 154—2.3 |
| 2,920,785 | 1/1960 | Veres | 154—2.3 |
| 2,951,167 | 8/1960 | Kegg et al. | 154—2.4 |
| 3,007,833 | 11/1961 | Jackman | 156—85 |
| 3,010,045 | 11/1961 | Plagge et al. | 156—293 |
| 3,064,380 | 11/1962 | Baut et al. | 156—298 |
| 3,075,870 | 1/1963 | Hedler et al. | 156—295 X |
| 3,166,211 | 1/1965 | Stel et al. | 220—2.1 |
| 3,206,056 | 9/1965 | Stel | 220—2.1 |
| 3,220,592 | 11/1965 | Powell et al. | 220—2.1 |
| 3,220,593 | 11/1965 | Powell et al. | 220—2.1 |

EARL M. BERGET, *Primary Examiner.*

HAROLD ANSHER, ALEXANDER WYMAN, JACOB STEINBERG, *Assistant Examiners.*